Nov. 28, 1933.   H. J. CRINER ET AL   1,937,264
ROTARY BREAD SLICING MACHINE
Filed May 16, 1931   5 Sheets-Sheet 1
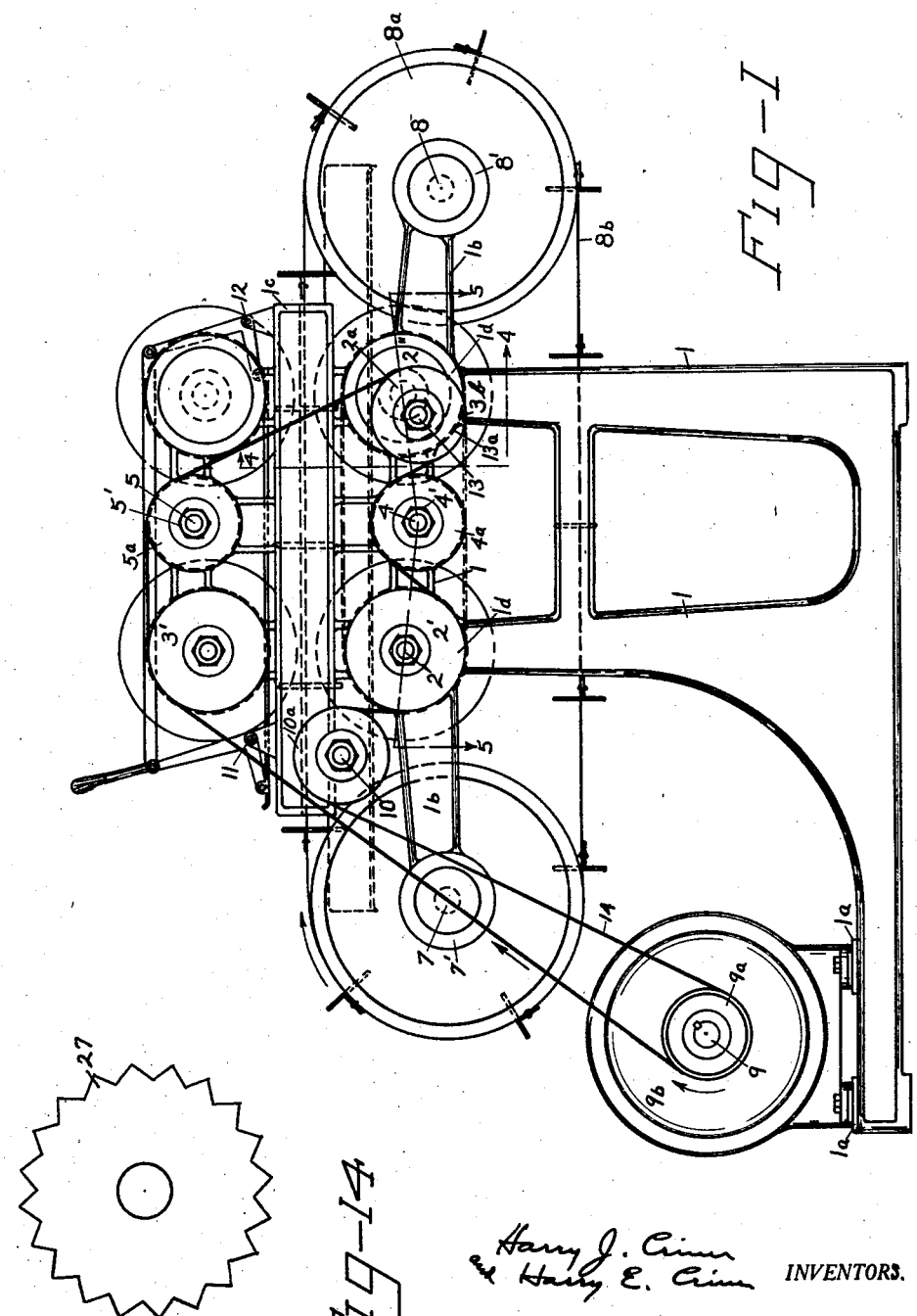
INVENTORS.
Harry J. Criner
Harry E. Criner
BY
ATTORNEY.

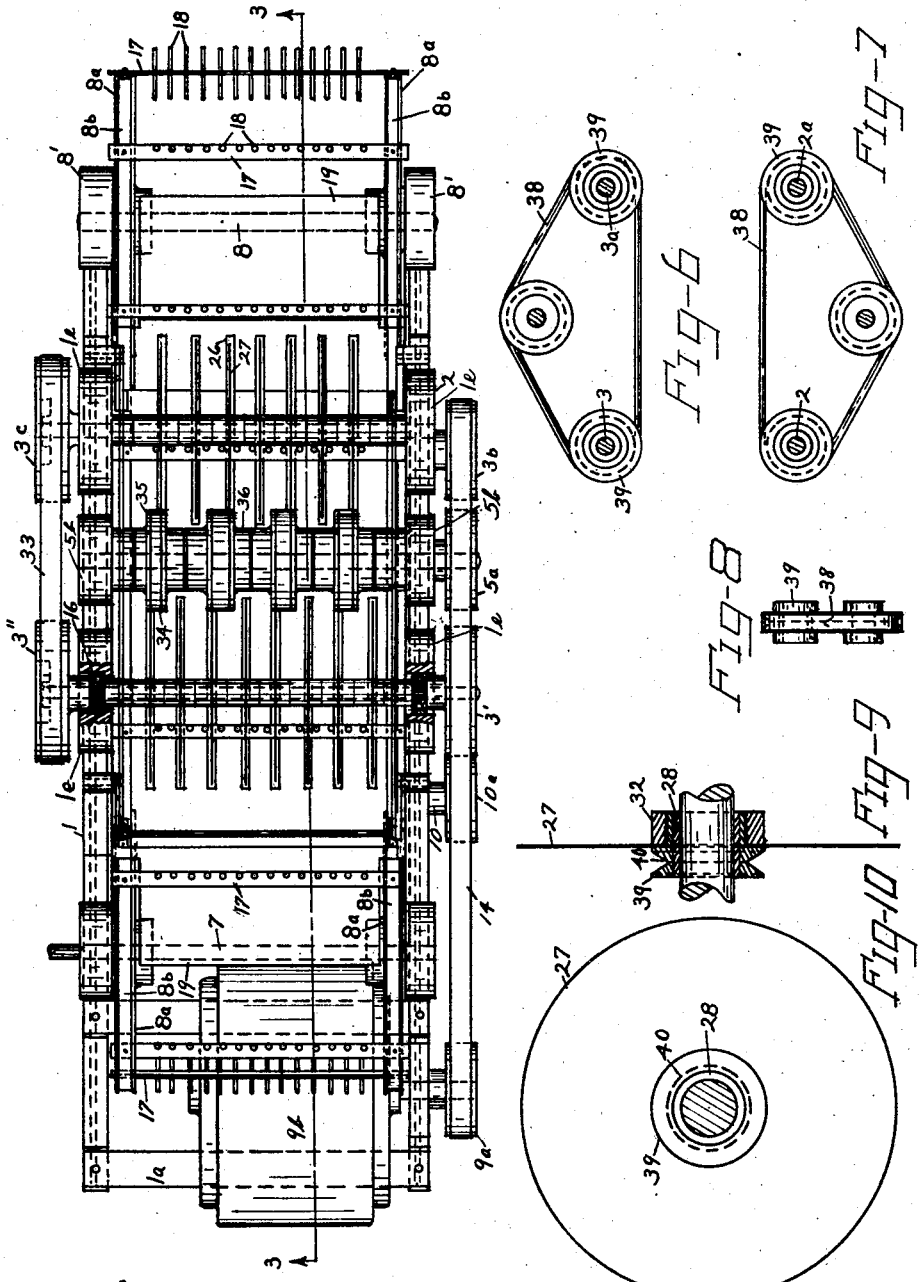

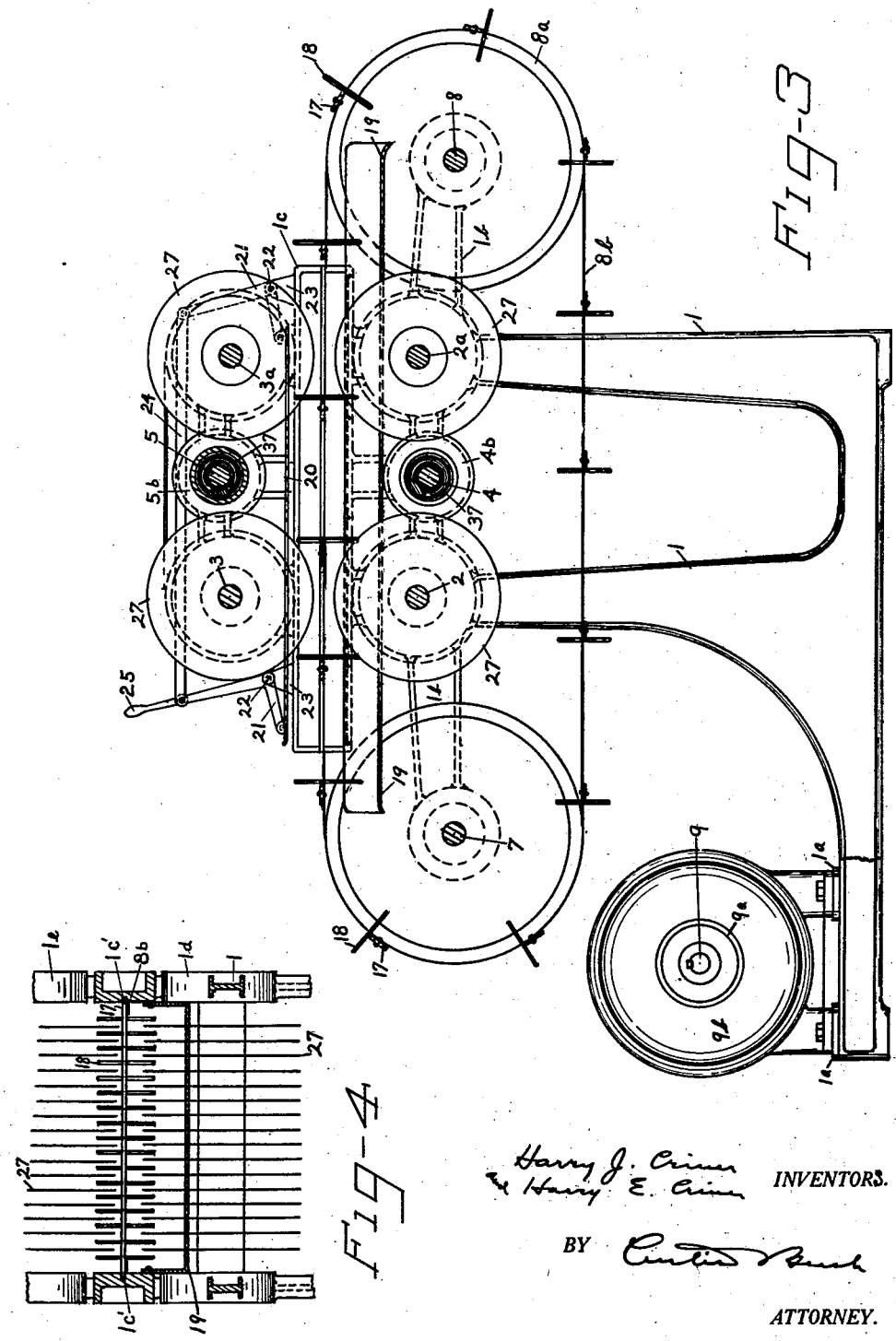

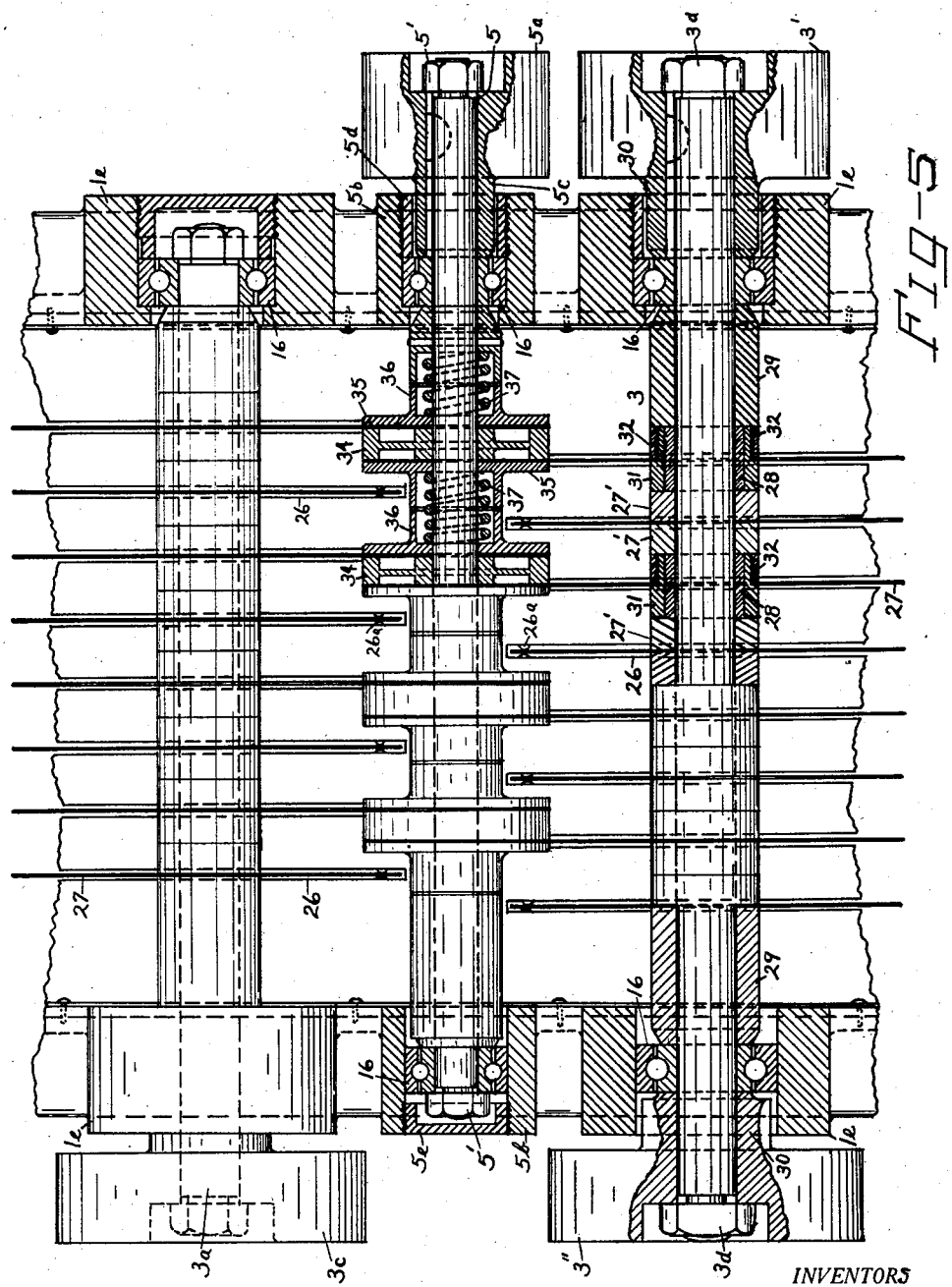

Nov. 28, 1933.                H. J. CRINER ET AL                1,937,264
                         ROTARY BREAD SLICING MACHINE
                         Filed May 16, 1931        5 Sheets-Sheet 5

INVENTOR
Harry J. Criner & Harry E. Criner
BY
Evans & McCoy
ATTORNEYS

Patented Nov. 28, 1933

1,937,264

UNITED STATES PATENT OFFICE 1,937,264

ROTARY BREAD SLICING MACHINE

Harry J. Criner and Harry E. Criner, Davenport, Iowa, assignors, by mesne assignments, to The Micro Corporation, Bettendorf, Iowa, a corporation of Delaware Application May 16, 1931. Serial No. 537,922

9 Claims. (Cl. 146—98)

Our invention relates to improvements in rotary bread slicing machine in which a plurality of series of rotary cutting blades are used to slice the bread from opposite sides of the loaf.

The objects of our invention are:

1. To provide a multiple-bladed bread slicing machine in which compaction or distortion of the loaf of bread while being cut, can be reduced or prevented;

2. To provide a multiple-bladed bread slicing machine in which alternate slicing blades run in opposite directions;

3. To provide means in a rotary bread slicing machine for retarding the passage of bread through the cutters and for securing steady, even travel of the loaves through the cutters;

4. To provide a rotary bread slicer which may be operated at high speed without distortion or compaction of the loaves being sliced;

5. To provide adjustable means adapted for loaves of different sizes to prevent displacement of the loaves while passing through the cutters.

We attain these objects by the means illustrated in the accompanying drawings, in which,—

Figure 1 is a side elevation of our machine;

Figure 2 is a plan view;

Figure 3 is a sectional elevation on the line 3—3 of Figure 2;

Figure 4 is an enlarged cross sectional detail on the line 4—4 of Figure 1;

Figure 5 is an enlarged detail plan view, partly in section;

Figure 6 is a sectional elevation showing an alternate form of drive for the upper cutter blades utilizing V-belts;

Figure 7 is a similar view of a corresponding form of drive for the lower cutter blades;

Figure 8 is an end view of the parts shown in Figure 7;

Figure 9 is an enlarged sectional detail of a cutter blade with alternate form of driving mechanism;

Figure 10 is a side detail view of the parts shown in Figure 9;

Figure 14 is an alternate form of cutting blade;

Similar numerals refer to similar parts throughout the several views.

Figure 13:
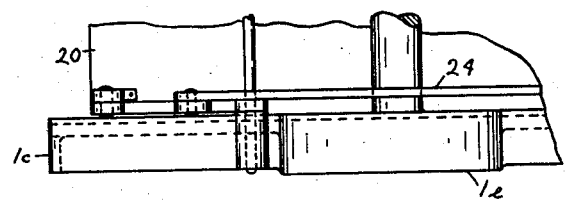
Figure 13 is an enlarged detail of the lever controlling the adjustment of the upper guide plate.

Our machine comprises a frame, 1, having vertical side members suitably connected by cross-ties, 1a, and by the various shafts hereafter described which may act as ties. Additional cross-members and longitudinal members may be formed as necessary to strengthen the frame and make it rigid.

Front and rear extensions, 1b, are formed integral with the frame as supports for the feed drive shafts, 7 and 8, which are mounted in bosses, 7' and 8', united to the extensions, 1b. Upper bosses, 1e, are formed integral with the frame, 1, and cutter shafts, 3' and 3a, are revolvably mounted in the bosses 1e. Corresponding lower bosses, 1d, are formed integral with the frame and lower cutter shafts, 2 and 2a, are revolvably mounted therein. Pulleys, 2', are mounted upon the outer ends of the shaft, 2, and a corresponding pulley, 2'', is mounted upon the left end of the shaft, 2a. For convenience, we refer to the left of Figure 2 as the front of the machine and to the right of it as the rear of the machine.

We prefer to utilize the bosses mentioned so as to provide room for ball bearings as shown in Figure 5, but it is obvious that the frame may be large enough to afford sufficient bearing surface for the shafts without the addition of the bosses.

Ball bearings, 16, are seated in the bosses to provide bearings for the cutter shafts, 2, 2a, 3 and 3a. Pulleys, 3' and 3'', are mounted upon the outer ends of the cutter shaft, 3, and a pulley, 3c, is mounted upon the left end of the shaft, 3a.

Lower and upper drive shafts, 4 and 5, are mounted in the frame in bosses, 4b and 5b, and are preferably provided with ball bearings, although any desired form of bearing may be used.

A motor, 9b, is mounted upon the cross-ties, 1a, and the motor shaft, 9, has a drive pulley, 9a, secured thereon adapted to drive a belt, 14, which passes over or around the cutter shaft pulleys, 3' and 2' and around an idler pulley, 3b, mounted upon the frame.

The belt, 14, also passes around and drives pulleys, 5a and 4a, which are mounted upon the right end of the drive shafts, 5 and 4. The belt, 14, also passes around an idler pulley, 10a, which is mounted upon a stub shaft, 10. The feed drive shaft, 7, is preferably formed with its left end extending through the frame of the machine and is intended to be driven by a connection with a wrapping machine or other suitable power. When closely connected to a wrapping machine, it is essential that the feeding apparatus of this machine be timed to coincide with the operation of the wrapping machine and for that purpose, it is desirable to have the shaft, 7, driven by the wrapping machine.

Upon the feed shafts, 7 and 8, I mount at either end sprocket pulleys, 8a, around which pass the sprocket chains or belts, 8b.

Instead or using sprocket chains, we prefer to use steel belts, or the feed may be driven in any desired manner.

Upon the bands, 8b, we mount a plurality of cross-bars, 17, each of which has a plurality of pins, 18, secured therein at right angles thereto. The cross-bars, 17, are made thin enough to pass between the opposed cutter blades hereinafter described, without coming in contact therewith and the pins, 18, are made small enough to pass between the planes occupied by the cutters without coming in contact with the cutters.

The side members of the frame, 1, are provided with longitudinal guide members, 1c, and on the inner face of the guide members, 1c, we form grooves, 1c', in which the outer ends of the feed bars, 17, travel. These grooves, 1c', form guides which secure the cross-bars rigidly in their line of travel between the opposed cutters, although in the drawings we have somewhat exaggerated the distance between the opposed cutters for clearness of illustration.

A supporting table, 19, is suitably supported upon the frame just above the lower shafts, 2 and 2a, and forms a support for the bread from the time it is fed into the machine until it leaves it.

A retaining table, 20, is provided to keep the bread from becoming displaced upwardly while passing through the cutters. The retaining table, 20, may be stationary, but as different bakers bake loaves of different thicknesses, we prefer to mount our retaining table, 20, upon bell crank levers, 21, mounted upon suitable pivot shafts, 22, upon lugs, 23, formed integral with the side bars, 1c, as shown in Figure 3.

The bell crank levers, 21, are mounted adjacent the four corners of the table, 20, and the upper ends of the levers, 21, are connected by links, 24. The levers upon opposite sides of the board are connected by the pivot shafts, 22, and one of the levers is provided with a handle, 25, to facilitate manual operation.

The mountings of the levers, 21, are preferably made tight enough to retain them in any position in which they may be placed, but additional means for locking them in position may be utilized if desired.

A throw of approximately one inch will be sufficient to meet any of the ordinary variations in bakers' loaves.

In order to aid in securing the bread against displacement, the pins, 18, may be made hollow and provided with movable rods, 18a, secured therein, with compression springs, 18b, mounted under the pins, 18, and adapted to force the rods outwardly into contact with the table, 20.

The tables, 19 and 20, are provided with slots, 26, to permit the cutters to revolve therein and the slots, 26, are preferably made narrow enough to form the guides for the cutters so that very thin cutters may be used and the guides will prevent distortion or bending thereof.

If desired, the slots may be formed with inwardly projecting portions as at 26a, to act as guides, or any other suitable form of guide may be secured to the tables, 19 and 20.

In order to slice the bread, we utilize a series of circular cutting blades, 27, and driving means which will drive the alternate blades upon a given shaft, in opposite directions. We accomplish this by securing one-half of the blades, 27, rigidly to the drive shaft, 3. These blades are secured between collars.

Between the collars, 27', we mount upon the shaft, 3, intermediate bushings, 28, with collars, 29, at each end of the shaft adjacent the ball bearings.

The pulleys, 3' and 3'', are provided with hubs, 30, and the hubs, 30, bear against the outer faces of the inner members of the ball bearings. Nuts, 3d, are threaded upon the outer ends of the shaft, 3, and when these nuts are properly tightened, they cause the collars, 29 and 27', and bushings, 28, upon the shaft to impinge tightly against each other so as to lock the collars, 27', and the cutters, 27, carried thereby, rigidly to the shaft, 3, so that when the shaft, 3, turns, the rigid cutters necessarily turn with it.

Upon the bushings, 28, we mount collars, 31. These collars have one end reduced in size and threaded to fit a ring, 32. Part of the cutters are formed with a central opening fitting closely upon the reduced end of the collars, 31, and a cutter is secured upon each collar, 31, by its corresponding ring, 32, which abuts against the body of the cutter and holds it in fixed relation to the collar, 31.

For convenience, we refer to the cutters, 27, which are rigidly secured to the shaft, 3, as the fixed or rigid cutters, and to the cutters which are mounted upon the collars, 31, as the loose cutters, and these fixed and loose cutters alternate upon each of the shafts.

The cutters upon the other cutter shafts are similarly mounted and alternate in the same way. It is obvious that when the shaft, 3, is revolved by the passing of the belt, 14, over the pulley, 3', all of the fixed cutters on the shaft, 3, will revolve with the pulley.

The collars, 31, and rings, 32, revolve freely upon the bushings, 28, and are made narrow enough to permit a free running fit between such collars and the collars, 27'.

Each of the upper cutter shafts is preferably driven in the same direction as the corresponding lower cutter shaft and the cutters upon the upper cutter shafts operate in the same planes as the corresponding cutters upon the lower cutter shafts.

The two upper cutter shafts are belted together and driven in the same direction by the belt, 33, but the cutters upon the left cutter shafts operate in planes which alternate with the cutters upon the right cutter shafts.

In order to drive the alternate upper cutters in opposite directions, we provide a reversing drive for the loose cutters. In Figure 5 we have shown such a drive comprising friction wheels, 34, rigidly united to the shaft, 5, by keys or other suitable means. These wheels are preferably formed cupped on each side. Spring-held plates, 35, formed integral with collars, 36, are mounted upon the shaft, 5, on each side of the wheels, 34, with compression springs, 37, acting to hold the plates in close contact with the wheels. Each of these wheels and its adjacent plates receives and drives one of the loose cutters upon each of the adjacent shafts, there being sufficient friction between the plates, 35, and the rims of the wheels, 34, to cause the cutters to rotate at the same peripheral speed as the friction wheels.

The pulley, 5a, is locked upon the shaft, 5, by a nut, 5', and a similar nut, 5', is screwed upon the opposite end of the shaft and abuts against the ball bearing, 16, at that end of the shaft. An adjusting ring, 5d, is threaded into the boss, 5b, adjacent the pulley, 5a, and abuts against the adjacent ball bearing, 16. This adjusting ring may be turned so as to fix the position of the ball bearing, 16, on that side of the machine. An adjusting ring, 5e, is threaded into the boss, 5b, at the opposite side of the machine and may be used to fix the position of the ball bearing, 16 at that side of the machine. By tightening the nuts, 5', upon the shaft, 5, the pressure upon the springs, 37, may be increased and thereby increase the friction of the wheels, 34, and plates, 35, upon the idler cutters driven by them. The pulleys, 3' and 5a, may be so proportioned as to cause the loose cutters to revolve at the same speed as the rigid cutters.

The mounting of the cutters upon the lower shafts is identical with that upon the upper shafts and need not be separately described.

Figure 12:
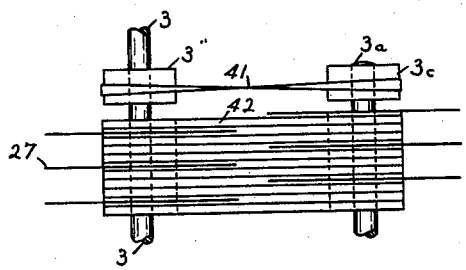
Figure 12 is a plan view of same.
Figure 15:
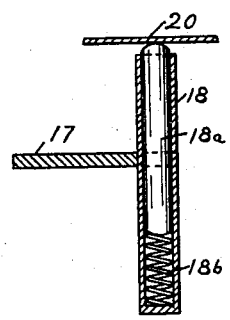
Figure 15 is an enlarged detail showing an alternate form of feed pin.
Figure 11:
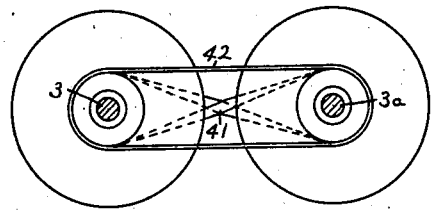
Figure 11 is a sectional detail elevation showing another form of driving mechanism.

Any desired form of differential drive which would be applicable to loose and rigid cutters, may be applied to our apparatus. In Figures 6, 7, 8, 9 and 10, we have shown a V-belt drive for the loose saws which utilizes a V-belt, 38, passing over collars, 39, having a V-shaped groove, 40, formed in the periphery thereof and in Figures 11 and 12, we have shown the cutter drive shafts, 3 and 3a, driven in opposite directions by a crossed-belt, 41, while V-belts, 42, are used to drive the loose collars upon one shaft from the fixed collars upon the opposite shaft.

It is obvious that various other forms of drive may be applied to accomplish this same result without departing from the spirit of our invention and we do not limit our claims to any precise form of reversing drive.

In the operation of our machine, the bread is fed onto the feeding table at the left of the machine as shown in Figure 1, either manually or by any desired kind of mechanical feed. As the loaves are laid upon the feeding table, they are carried forward by the pins, 18, until they come in contact with the first series of cutters. The table, 20, is preferably arranged at a height which will just clear the bread as it is fed between the cutters so as to prevent any substantial upward movement of it when it comes in contact with the cutters. As the alternate cutters revolve in opposite directions, the tendency to compress or compact the bread will be restricted and the tendency to cause the bread to move upwardly will also be reduced or prevented.

The reverse direction of movement of the cutting blade will also prevent the cutting blades from carrying the bread away from the pins and permit same to be fed steadily and smoothly through the cutters.

While we have shown but two opposed series of cutters, it is obvious that if desired, one or more additional opposed sets of cutters may be added, but by utilizing the means shown for retaining the bread and by utilizing thin cutter blades with guides to prevent distortion thereof, two pairs of opposed sets of cutters will ordinarily be sufficient.

This machine is designed to be capable of running at a relatively high speed and the feeding devices may be proportioned so as to feed the bread with corresponding rapidity.

We claim:

1. A rotary bread slicing machine comprising a frame, a plurality of opposed pairs of cutter shafts revolvably mounted in the frame, a plurality of fixed cutters united to each of the respective cutter shafts, a plurality of loose cutters revolvably mounted upon each of the cutter shafts in alternation with the fixed cutters, the cutters upon both shafts of a given pair being mounted to revolve in the same planes and the cutters upon each pair of shafts being mounted to revolve in planes corresponding with but alternating with the planes of the cutters upon the adjacent pair or pairs of shafts, means for driving said cutter shafts, and friction means for driving said loose cutters.

2. A rotary bread slicing machine comprising a frame, a plurality of opposed pairs of cutter shafts revolvably mounted in the frame, a plurality of fixed cutters united to each of the respective cutter shafts, bushings mounted on the cutter shafts in alternation with the fixed cutters, a plurality of loose cutters revolvably mounted upon the bushings respectively, the cutters upon both shafts of any given pair being mounted to revolve in the same planes and the cutters upon each pair of shafts being arranged in staggered relation to the cutters upon the adjacent pair or pairs of shafts, and means for driving the fixed and loose cutters on each shaft in opposite directions.

3. A rotary bread slicing machine comprising a frame, a plurality of opposed pairs of cutter shafts revolvably mounted in the frame, a plurality of fixed cutters united to each of the cutter shafts, bushings mounted on the cutter shafts in alternation with the fixed cutters, a plurality of loose cutters revolvably mounted upon the bushings, the cutters upon each pair of shafts being mounted to revolve in the same planes, the cutters on one shaft of each pair of shafts being offset with respect to the adjacent cutters on the corresponding shaft of the next adjacent pair of shafts, means for rotating said shafts, and friction means for rotating said loose cutters of each shaft in a direction opposite to the direction of rotation of the said shaft.

4. A rotary bread slicing machine comprising a frame, a plurality of pairs of opposed cutter shafts revolvably mounted in the frame, a plurality of fixed cutters united to each of the respective cutter shafts, a plurality of loose cutters revolvably mounted upon the cutter shafts in alternation with the fixed cutters, separate friction drive shafts mounted in the frame with friction drive assemblies mounted thereon adapted to engage and drive the loose cutters, each friction drive assembly corresponding with and having driving engagement with the loose cutters upon corresponding shafts of two pairs of opposed cutter shafts, and means to drive the cutter shafts and friction drive shafts simultaneously.

5. A rotary bread slicing machine comprising a frame, a pair of opposed cutter shafts revolvably mounted in the frame, a plurality of fixed cutters united to each of the respective cutter shafts, bushings mounted on the cutter shafts in alternation with the fixed cutters, a loose cutter revolvably mounted upon each of the respective bushings, the cutters upon both shafts being mounted to revolve in the same planes, the fixed cutters upon each shaft being arranged in the same planes as the loose cutters upon the opposed shaft, and means for driving the fixed and loose cutters on each shaft in opposite directions.

6. A rotary bread slicing machine comprising a frame, a plurality of opposed pairs of cutter shafts revolvably mounted in the frame, a plurality of fixed cutters united to each of the respective cutter shafts, a plurality of loose cutters revolvably mounted upon each of the cutter shafts in alternation with the fixed cutters, the cutters upon both shafts of a given pair being mounted to revolve in the same planes and the cutters upon each pair of shafts being arranged in staggered relation to the cutters upon the adjacent pair or pairs of shafts, and means for driving the fixed and loose cutters on each shaft in opposite directions.

7. A rotary bread slicing machine comprising a frame, a series of upper rotary cutter shafts, a series of lower rotary cutter shafts, a plurality of fixed cutters secured to each of said shafts, a plurality of loose cutters mounted for rotation on each of said shafts in alternation with said fixed cutters, the cutters on each shaft of each series being offset relative to the cutters on the next adjacent shaft of the same series and each loose cutter on one shaft of each series being in the same plane as a fixed cutter on the next adjacent shaft of the same series, friction drive elements for said loose cutters, drive shafts for said elements, each friction drive element having frictional driving engagement with a loose cutter of one shaft and a loose cutter of the next adjacent shaft of the same series, and means for driving said cutter and drive shafts to rotate said fixed and loose cutters on each cutter shaft in opposite directions.

8. A rotary bread slicing machine comprising a frame, a plurality of cutter shafts, a series of spaced cutters rigidly secured to each of said shafts, means for rotating said shafts, a second series of spaced cutters rotatably mounted on each of said shafts, each cutter of said last series of cutters being disposed between cutters of the first series of cutters, and means for rotating said second series of cutters in a direction opposite to the direction of rotation of the cutters of said first mentioned series, the cutters on each shaft being offset relative to the cutters of the next adjacent shaft.

9. A rotary bread slicing machine comprising a frame, a plurality of opposed pairs of cutter shafts revolvably mounted in the frame, a plurality of fixed cutters united to each of the cutter shafts, a plurality of loose cutters revolvably mounted upon each of the cutter shafts in alternation with the fixed cutters, the cutters upon each pair of shafts being mounted to revolve in the same planes, means for rotating said cutter shafts, and friction means common to the loose cutters of one shaft of one pair of shafts and the loose cutters of one shaft of the adjacent pair of shafts for rotating the loose cutters on each shaft in a direction opposite to the direction of rotation of the shaft.

HARRY J. CRINER.
HARRY E. CRINER.